Figure 2:
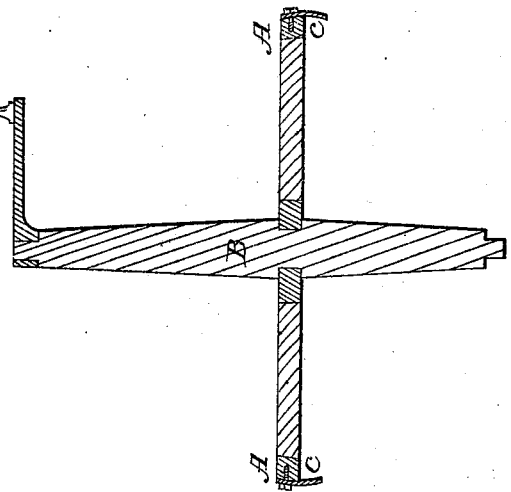

H. Holmes,
Making Staves.
Nº 527.   Patented Dec. 20, 1837.

UNITED STATES PATENT OFFICE.

HARVEY HOLMES, OF NEW MARLBOROUGH, MASSACHUSETTS.

MACHINE FOR SAWING STAVES.

Specification of Letters Patent No. 527, dated December 20, 1837.

*To all whom it may concern:*

Be it known that I, HARVEY HOLMES, of New Marlborough, in the county of Berkshire and State of Massachusetts, have invented a new and useful Machine for the Sawing of Staves for the Making of Hogsheads, Barrels, Kegs, &c., and that the following is a full and exact description thereof.

I prepare a wheel of such diameter as is adapted to the longitudinal curvature of the stave to be sawed; which for hogsheads will be about twenty five feet. This wheel may be of wood, or of cast iron, and it is to be mounted on a shaft having suitable bearings on which it may revolve. The shaft may be placed either horizontally, or vertically, as may be preferred. The periphery of this wheel is to be turned perfectly true, and curved on its cross section, the curvature being the same as that which the staves ought to receive in their cross section to fit them to make a hogshead, or other vessel which shall be perfectly round. Upon the periphery, so prepared the teeth by which the sawing, or cutting is effected, are to lie affixed. They may be cut upon long steel plates to which the proper curvature must be given; but I prefer to make the teeth each of a distinct piece of sheet steel, furnished with a slot through which a screw passes to fasten it on to the periphery of the wheel, and which also allows of its being adjusted as the point wears off. They are to project on one side of the wheel in the manner of the teeth of a crown wheel, to the distance of the width of a stave; which for those of a larger kind will be about six inches. They are to be bent to the curva ture of the stave in its cross section, or the same curvature as that given to the periphery of the wheel.

The staves are to be cut from plank of the proper length and thickness, the side of the plank being presented to the saw, which is to cut them the lengthway of the grain, or from end to end of the staves. When the wheel is made to revolve horizontally the teeth are to project downward, and the plank to be cut is placed upon suitable platforms which are to be caused to rise so as to feed the stuff up to the saw; which motion may be effected by screws, levers racks and pinions, or otherwise. There may be as many of such platforms as can be conveniently placed around the wheel, provided the driving power be sufficient. They are to rise on a curve, the same as that of the saw teeth. When the wheel is made to revolve vertically the mode of feeding must be adapted thereto, and the cutting may be effected on different floors, erected for that purpose, one above the other; the teeth may, in this case, if the power applied be sufficient, be made to project from each side of the wheel, so as to cut double or be fed on both sides.

I intend usually to give a greater thickness to the teeth at the cutting edge than elsewhere, so as to cut clear without setting. The teeth may however, be made to slope alternately in reversed directions, so as to produce the effect of setting, which may be effected by giving the proper cant to the rim of the wheel.

I do not describe any particular mode of feeding, or of holding, the stuff to be sawed; but intend to adapt any of the ordinary and well known ways of accomplishing this object. My invention being confined entirely to the construction and operation of the sawing wheel, or wheels.

By placing two or three such wheels as I have described upon the same shaft, and giving to them the diameter respectively required, they may be made to cut staves of two or three different sizes by the application of the same motive power.

It may sometimes be preferred for the saving of room to form a segment, or segments, of a wheel, and to attach teeth thereto in the way described, so as to use such segment or segments, by giving them a vibratory motion, which may be effected by the aid of a crank, and a shackle bar leading therefrom to one of the arms by which such segment or segments are attached to the main shaft. This mode of operating, though similar in the principle and results to that first described, would be less advantageous, and is not, therefore, to be recommended.

Figure 1:
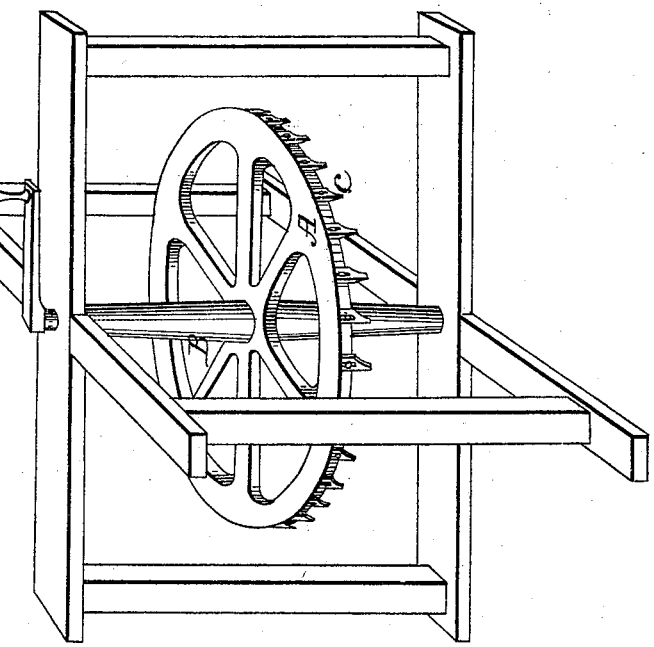

In the accompanying drawing Figure 1 represents a perspective view of the wheel, and Fig. 2, a cross section of it. A is the rim of the wheel, B, its shaft, and C, C, the cutting teeth attached to the periphery.

What I claim as my invention, and wish to secure by Letters Patent, is—

The construction and use of a wheel, or segment, or segments thereof, which wheel or segment shall have a radius the same, or nearly the same, with that of the stave to be cut, taken longitudinally; said wheel having teeth on its periphery, which are to be bent, lengthwise, so as to cut such stave to the proper curvature, transversely; the whole constructed and operating substantially in the manner herein set forth, for sawing or cutting staves lengthways of the grain of the stuff.

HARVEY HOLMES.

Witnesses:
W. THOMPSON,
OWEN McCUE.